No. 642,847. Patented Feb. 6, 1900.
D. W. HUGHES.
POKE.
(Application filed Oct. 19, 1899.)
(No Model.)
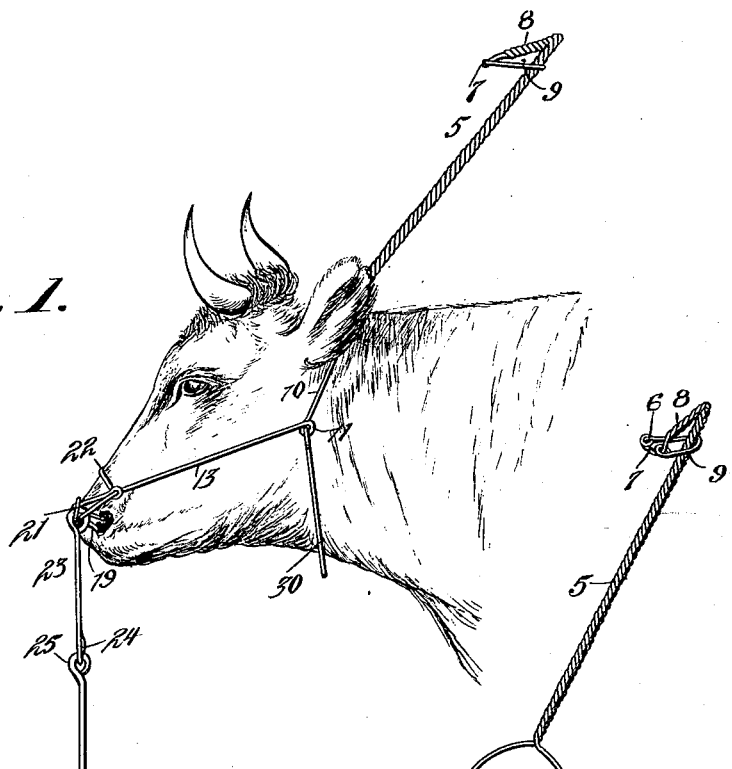
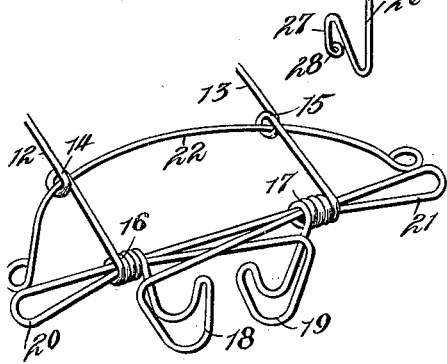
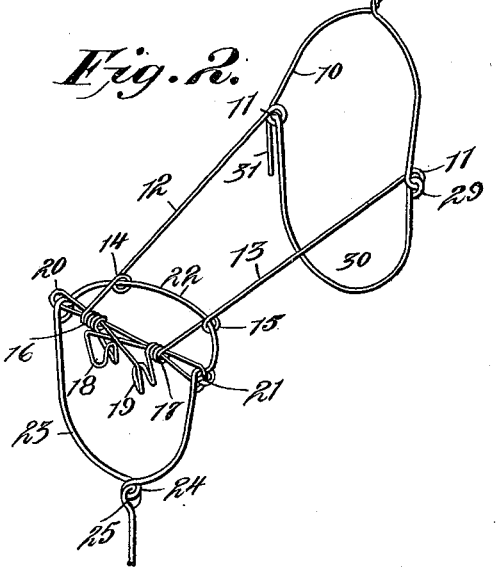
Witnesses
Clarence H. Walker
Geo. H. Chandler
D. W. Hughes Inventor
By his Attorneys,
C. A. Snow & Co.

UNITED STATES PATENT OFFICE.

DANIEL W. HUGHES, OF MOORE, OKLAHOMA TERRITORY, ASSIGNOR OF ONE-HALF TO WILLIAM C. GRAVES, OF WHITEROCK, OKLAHOMA TERRITORY.

POKE.

SPECIFICATION forming part of Letters Patent No. 642,847, dated February 6, 1900.

Application filed October 19, 1899. Serial No. 734,038. (No model.)

*To all whom it may concern:*

Be it known that I, DANIEL W. HUGHES, a citizen of the United States, residing at Moore, in the county of Cleveland and Territory of Oklahoma, have invented a new and useful Animal-Poke, of which the following is a specification.

This invention relates to animal-pokes; and it has for its object to provide a construction which may be applied to the head of an animal and having fingers adapted to enter the nose and means for operating the fingers to pinch when the animal attempts to go over or through an obstruction.

A further object of the invention is to form a cheap and simple construction and arrangement of parts and one which will be effective in its operation.

In the drawings forming a portion of this specification, and in which like characters of reference designate corresponding parts in the several views, Figure 1 is a side view of the poke and showing its application to the head of a cow. Fig. 2 is a perspective view of the poke detached. Fig. 3 is a detail perspective showing the construction and arrangement of the pinching-fingers.

Referring now to the drawings, the poke comprises a major portion consisting of a single wire bent upon itself, and the ends of which wire are twisted together, as shown at 5. The extremities of these twisted ends are bent outwardly and then curved inwardly into mutual alinement, as shown at 6, to form an eye 7, and the end of the twisted portion is bent to form a hook 8. A link 9, consisting of a U-shaped wire, has its ends bent to form eyes, which engage the sides of the eye 7, the link being disposed to inclose the twisted portion 5 below the bill of the hook 8. The length of this link is somewhat greater than the distance between the eye 7 and the portion 5, so that the link may have a swinging movement and lie with its bight intermediate the bight and tip of the hook 8. The portion 5 being twisted, it is, in effect, transversely corrugated, whereby the bight of the link 9 may lie in a corrugation to prevent outward bending of the hook when pressure is brought to bear against its tip, as hereinafter described.

The wire of which the major portion is formed is curved outwardly at the inner end of the portion 5 and then continued substantially parallel, as shown at 10, after which each side of the parallel portion 10 has an eye 11 formed therein, the wire then being bent with its two parts 12 and 13 converging and in a common plane at a broad angle to the plane of the portions 10. Each side or element 12 and 13 of the wire is then bent to form a second eye 14 and 15, respectively, and is continued beyond the eye and bent to form a helix 16 and 17, respectively, in axial alinement and lying between the portions 12 and 13. From the ends of the helixes 16 and 17 each side or element of the wire is bent outwardly and then inwardly at right angles to the helixes and then passed in opposite directions each through the helix of the opposite portion, after which they are bent upon each other and returned through said helixes, between which they coincide to form flexible guides. The loops above referred to are then bent toward each other to form double hooks 18 and 19, the bills of which converge and are separated at their tips by a slight interspace.

Connected with the loops 20 and 21 formed by the passing and the return of the sides of the wire through the helixes 16 and 17 are the ends of a bail 22, which is also passed through the eyes 14 and 15 and serves to brace the structure in addition to forming a support which rests across the nose of the animal. A second bail 23 has a swinging connection with the loops 20 and 21 and ends of bail 22 and has an eye 24 formed between its ends, connected with which is the eye 25 at the end of the stem of a hook 26, the tip of the bill of which is bent outwardly and rearwardly, as shown at 27, to form a runner to prevent catching of the hook in the ground as the animal grazes, this backwardly-bent portion having an eye 28 formed therein, the side of which rests upon the outer surface of the bill of the hook 26, near the bight, and acts to strengthen the hook at its tip.

Connected with one of the eyes 11 is the eye 29 at one end of a throat-latch 30, formed of wire, and the opposite end of which latch has a hook 31, adapted for engagement with the opposite eye 11 to hold the latch in position.

In practice the poke is applied to the head of the animal, as shown in Fig. 1 of the drawings, the portion 5 extending upwardly and above the neck of the cow or other animal and the hook 8 projecting forwardly. The throat-latch 30 is passed beneath the throat of the animal, and the fingers formed by the hooks 18 and 19 are entered in the nostril of the animal, the portion 22 lying across the nose. The bail 23 depends from the loops 20 and 21, and from this bail depends the hook 26. Thus if the animal attempt to go over a fence or other obstruction the hook 26 will catch, drawing the ends of the loops 20 and 21 downwardly and bending the wire intermediate the helixes 16 and 17 over the nose of the animal and bringing the fingers formed by the hooks 18 and 19 toward each other with a pinching action, causing the animal to desist in its attempts. If the animal attempt to go under a fence or through a fence the hook 8 will catch and will draw the fingers rearwardly and will exert a strain upon the tissues of the nostrils, inflicting much pain and securing the desired result.

It will of course be understood that in practice any desired material may be employed for the different parts of the structure and that the specific construction and proportions may be varied without departing from the spirit of this invention.

What I claim is—

1. An animal-poke comprising a major portion adapted to receive the head of an animal and comprising a flexible guide, a hook formed integral with the major portion, fingers formed integral with the major portion and mounted upon the guide, said fingers being adapted to engage the nostril of the animal, and a second hook pivotally connected with the guide adjacent the fingers and adapted to move the fingers toward each other when subjected to strain.

2. An animal-poke comprising a major portion adapted to receive the head of an animal, a hook carried by the major portion, movable fingers carried by the major portion and adapted to engage the nostrils of the animal, a bail pivoted to the major portion adjacent to and in operative relation with the fingers, and a hook connected with the bail and adapted to transmit strain to the bail to move the fingers toward each other.

3. An animal-poke comprising a major portion adapted to receive the head of an animal, a hook formed integral with the major portion, a resilient guide, spring-fingers upon the guide formed integral with the major portion and adapted to engage the nostrils of the animal and means connected with the guide for moving the fingers toward and away from each other.

4. An animal-poke comprising a major portion adapted to receive the head of an animal and having a throat-latch, a movable hook formed integral with the major portion and extending upwardly therefrom, inwardly-directed hook-fingers formed integral with the major portion, a bail pivotally connected with the major portion adjacent to and in operative relation with the hook-fingers, and a hook pivotally connected with the bail and adapted to transmit strain through the bail to the hook-fingers to move them toward each other.

In testimony that I claim the foregoing as my own I have hereto affixed my signature in the presence of two witnesses.

DANIEL W. HUGHES.

Witnesses:
S. J. GRAVES,
JENNIE F. PATTON.